United States Patent [19]

Bushman

[11] Patent Number: 5,793,889

[45] Date of Patent: Aug. 11, 1998

[54] PLUME OR COMBUSTION DETECTION BY TIME SEQUENCE DIFFERENTIATION

[75] Inventor: Boyd B. Bushman, Lewisville, Tex.

[73] Assignee: Lockheed Corporation, Fort Worth, Tex.

[21] Appl. No.: 450,329

[22] Filed: May 25, 1995

[51] Int. Cl.$^6$ ............... G06K 9/00; G06K 9/46; G06K 9/68; G06K 9/36

[52] U.S. Cl. ............ 382/221; 89/1.11; 244/3.16; 244/3.17; 347/117; 347/169; 364/462; 250/342; 382/103; 382/203; 382/286; 382/318

[58] Field of Search ............ 342/52–53, 56, 342/192, 351; 250/372, 342; 244/3.16, 3.17, 3.13, 3.1, 3.11, 3.15, 2.16; 382/103, 194, 201, 203, 206, 221, 236, 286, 299, 318; 348/162, 164, 165, 94, 117, 119, 169–172, 601, 620, 734, 588, 589, 599, 565; 364/462; 89/1.11

[56] References Cited

U.S. PATENT DOCUMENTS

| | | | |
|---|---|---|---|
| 4,424,943 | 1/1984 | Zwim et al. | 364/462 |
| 4,652,917 | 3/1987 | Miller | 348/135 |
| 4,905,292 | 2/1990 | Wentwort et al. | 382/1 |
| 4,930,510 | 6/1990 | Lindstrom | 128/654 |
| 5,289,993 | 3/1994 | McWilliams et al. | 244/3.15 |
| 5,323,987 | 6/1994 | Pinson | 244/3.16 |
| 5,341,142 | 8/1994 | Reis et al. | 342/64 |
| 5,345,514 | 9/1994 | Mahdavieh et al. | 382/152 |
| 5,596,509 | 1/1997 | Karr | 235/411 |

*Primary Examiner*—Bipin Shalwala
*Attorney, Agent, or Firm*—James E. Bradley

[57] ABSTRACT

A method and system of image modulation detection of an aircraft exhaust plume by time sequence differentiation is provided. The method comprises the steps of forming two sequential images of the field of view in which an exhaust plume to be detected is located, and forming a differential image from the sequential images showing components of the aircraft's exhaust plume that are modulating at a rate greater than the frame rate of the detection system. The nonmodulating components such as the sky hills, and even the missile body are eliminated from the differential image. Only the plume remains and only the plume is detected. Therefore there is not false alarm note. Each image is formed by a plurality of pixels, wherein each pixel images a portion of the field of view. A value is assigned to each pixel in each of the sequential images that corresponds to one or more characteristics of the pixel. The value of each pixel in one sequential image is subtracted from the value of the corresponding pixel in the other sequential image to produce a value for a resultant pixel. The differential image is formed by imaging the resultant pixels that have a non-zero value, wherein the differential image shows components of the aircraft's exhaust plume that are modulating at a rate greater than the frame rate of the detection system.

11 Claims, 3 Drawing Sheets

PLUME OR COMBUSTION DETECTION BY TIME SEQUENCE DIFFERENTIATION

BACKGROUND OF THE INVENTION

1. Field of the invention:

This invention relates in general to image detection techniques, and in particular to a method of image detection of vehicles having gaseous emissions such as missiles, aircraft, operating land vehicles, ships, and unhoused engines to provide an early warning and countermeasure to the potentially threatening vehicle. Still more particularly, the present invention relates to a method of image detection of anti-aircraft missiles so that an anti-missile countermeasure can be rapidly deployed and the aircraft's pilot can be warned of the threatening missile.

2. Description of the Prior Art:

Most military jets that are downed by an enemy are destroyed by missiles. The missiles may be either radar or infrared guided missiles. If the aircraft pilot detects the missile being fired at him, he can take countermeasures. He can make tight maneuvers, and he can eject flares and metal chaff to confuse either heat or radar guided missiles.

The countermeasures require that the pilot be able to detect the missile before it becomes too close for any countermeasures to be taken. Once the missile is launched, the pilot has only about one second to detect it, and another two seconds to start the countermeasures. Current systems do not provide adequate and timely detection of the launching of a missile.

Modern aircraft are vulnerable to missiles because of active and passive missile guidance techniques. The missile can passively lock onto the aircraft plume, hot metal parts and/or aircraft emissions such as radar and radio. Actively, the missile can be guided to the airplane by its own radar, the aircraft's radar, or laser guidance system.

The aircraft is not usually warned of the oncoming missile because radar warning techniques will give away the position of the aircraft. Present infrared techniques are useless because of the extremely high number of heat sources in the battle field, each of which looks like a missile to existing infrared systems. There may be other aircraft in the area, including friendly aircraft which may produce heat. Ground fire could also cause a false alarm. Even if detected, the pilot must learn of the fired missile early enough to begin his countermeasures.

Present video, infrared, and other detection methods see so much scene detail that it is difficult to differentiate missile launches from the rest of the background scene. This detection problem exists not only for military jets, but also for defensive systems on land targets.

SUMMARY OF THE INVENTION

According to the present invention, a method and system of image modulation detection of an aircraft exhaust plume by time sequence differentiation is provided. The method comprises the steps of forming two sequential images of the field of view in which an exhaust plume to be detected is located, and forming a differential image from the sequential images showing components of the aircraft's exhaust plume that are modulating at a rate greater than the frame rate of the detection system. The nonmodulating components such as the sky hills, and even the missile body are eliminated from the differential image. Only the plume remains and only the plume is detected. Therefore there is not false alarm note. Each image is formed by a plurality of pixels, wherein each pixel images a portion of the field of view. A value is assigned to each pixel in each of the sequential images that corresponds to one or more characteristics of the pixel. The value of each pixel in one sequential image is subtracted from the value of the corresponding pixel in the other sequential image to produce a value for a resultant pixel. The differential image is formed by imaging the resultant pixels that have a non-zero value, wherein the differential image shows components of the aircraft's exhaust plume that are modulating at a rate greater than the frame rate of the detection system.

DETAILED DESCRIPTION OF THE INVENTION

Figure 1:
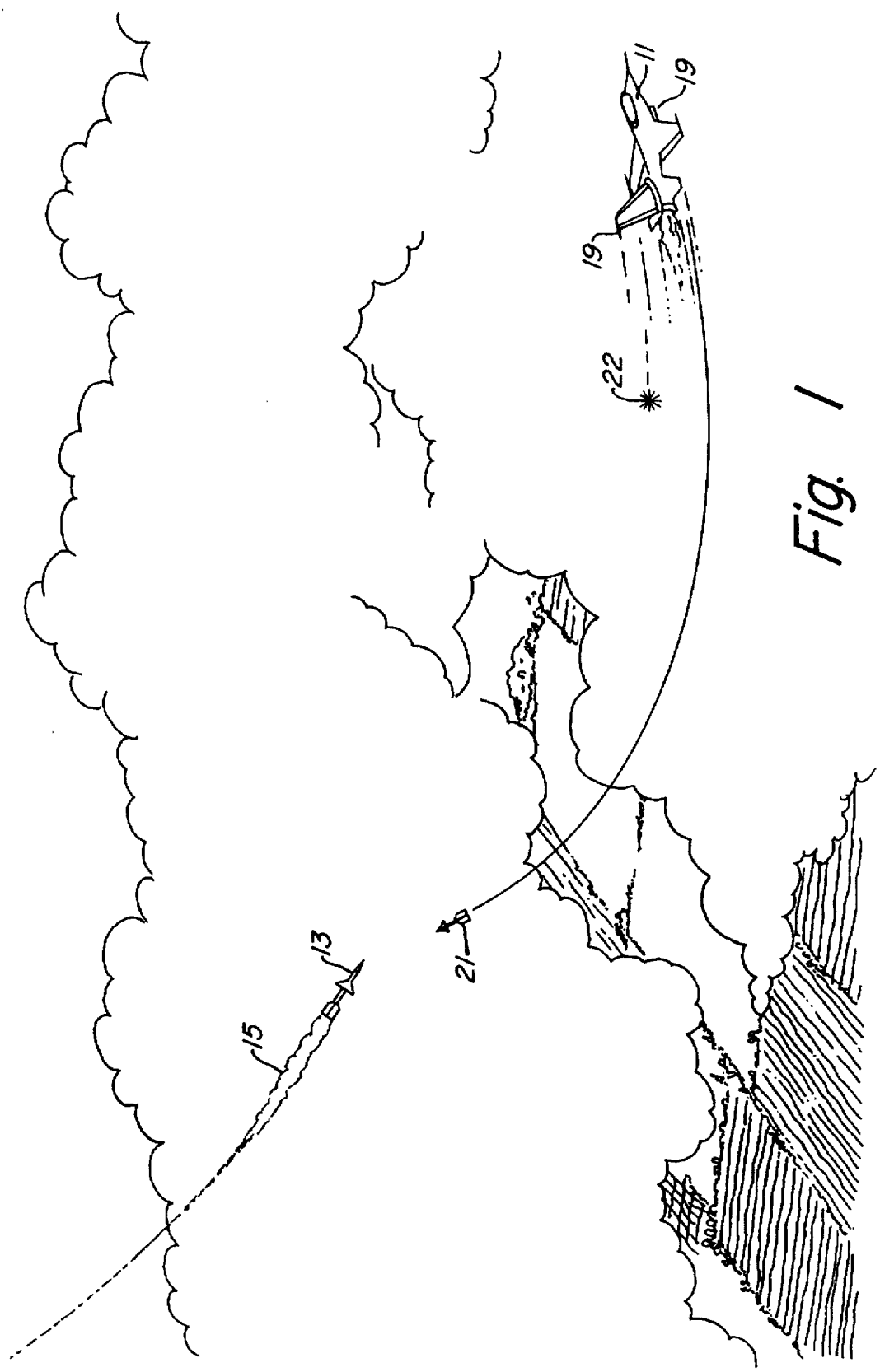
FIG. 1 is a perspective view of an aircraft being warned of a pursuit by a missile and the taking of appropriate countermeasures.

Referring to FIG. 1, a military jet aircraft 11 is shown being pursued by an attacking missile 13. Missile 13 may either be radar guided or guided by an infrared detector, for example. Missile 13 will be powered by a rocket engine that discharges, at least initially, a hot gaseous plume 15. Plume 15 will be considerably larger in diameter that the diameter of the missile 13. In addition, it will stream behind the missile 13 a considerable distance.

Plume 15 is made up of molecules and atoms discharging at high exit velocities from missile 13. The molecules and the atoms will radiate optically and electromagnetically, and will reflect light. Radio frequency waves will radiate, possibly because the plume 15 becomes positively charged as a result of electrons being stripped from the atoms exiting at high velocity. This radiation will radiate in all directions. Also, plume 15 can be seen by the reflection of visible infared and ultraviolet light from the plumes molecules and atoms.

Tests have determined that the plume 15 will flicker, similar to the flicker of a flame, but at a much higher rate. This flicker or modulation of the radiation and reflection can be detected by a detection system 19 on the aircraft 11. The detection system 19 includes an electro-optical detector, such as an ultraviolet detector. Furthermore, it could be a radio frequency receiver. It may also include an infrared detector or video camera. Normally, there will be several detectors on the aircraft 11 in at least two different locations to observe in all directions.

One suitable infrared detector is a cryogenically cooled indium antimonide infrared detector. It must be cooled to about 80 degrees Kelvin. Liquid nitrogen may be employed to cool the infrared detector.

The detection system 19 also includes a room temperature visible and/or ultraviolet detector, such as a silicon detector. The silicon detector measures both the visible and the ultraviolet light waves. The detection system 19 also includes a radio receiver. The detection system 19 also includes a television or video camera that detects and forms an image from visible light.

The detection system 19 will detect the flicker of the plume 15, identify it as coming from a missile 13, and provide a warning to the pilot of the aircraft 11. The pilot may take countermeasures to avoid being struck by the missile 13. In addition, he may actively attack the missile such as by firing an anti-missile missile 21, laser or particles. In a preferred embodiment, the detection system 19 will automatically take countermeasures such as deploying a flare 22 in response to detecting the plume 15.

The exhaust or plume of a rocket or jet engine create gas emissions moving at very high velocities. The present invention provides a means of locating, identifying and displaying these plume or gas emissions. The detection system 19 detects the time variant modulations within the plume and displays their time variant differences to provide an early warning of a rapidly approaching object such as a missile or aircraft.

Figure 2:
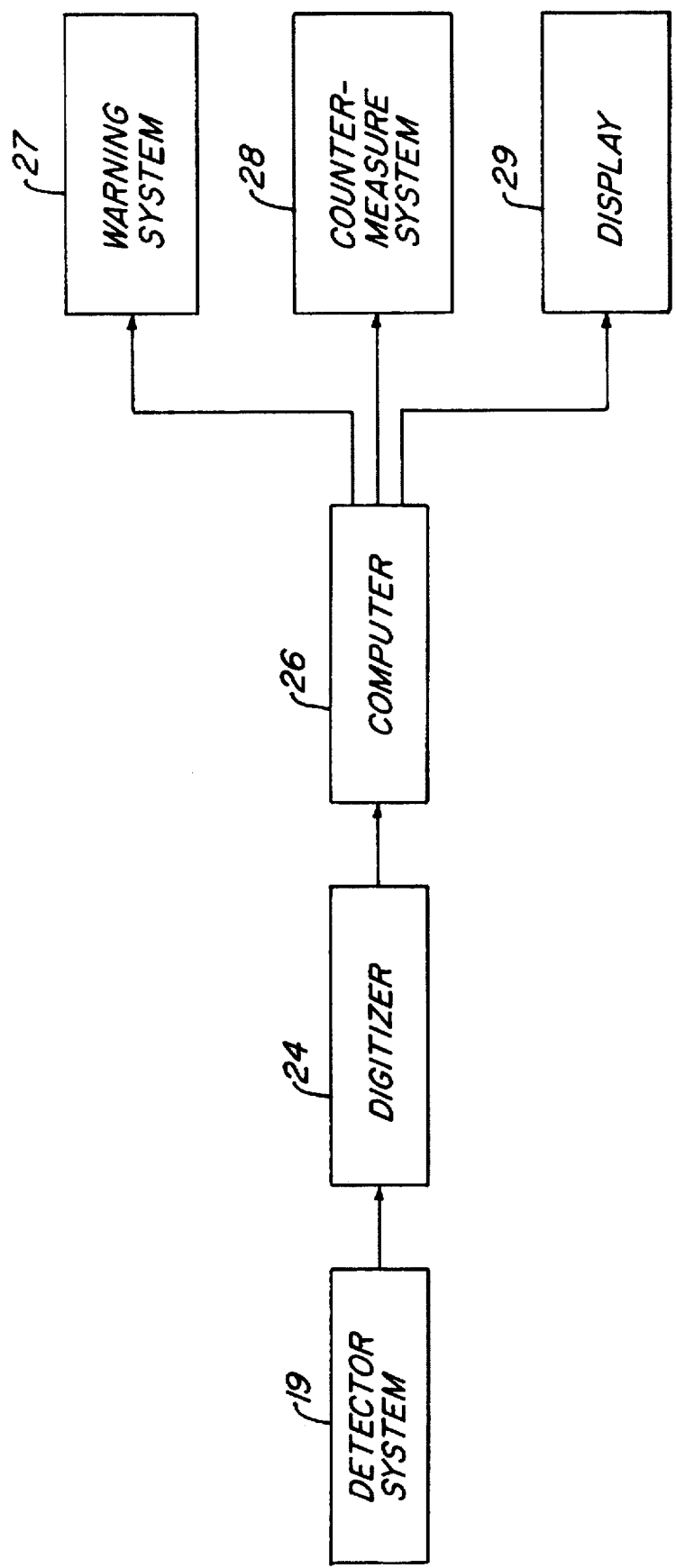
FIG. 2 is a block diagram of a detector system that detects the exhaust plume of an aircraft utilizing missile modulation detection by time sequence differentiation and provides a warning signal and countermeasure when the exhaust plume is detected.

FIG. 2 shows block diagram of a detection/warning/countermeasure system that detects the exhaust plume of an aircraft. Detector system 19 forms two sequential picture images of a field of view in which a missile, aircraft or other moving object to be detected is located. Each picture image is formed by a plurality of pixels that each image a portion of the field of view. The sequential picture images can be formed by any one of the above-described detection mechanisms in detection system 19, particularly the video or infrared (IR) cameras.

As is known by those skilled in the art, the process of detecting an image through light detection via televisions or IR sensors involves the camera's detector scanning an image and producing a voltage proportional to the light intensity received. Typically, such detection is performed by raster scanning the image, where several hundred horizontal scans make up the image. This raster scan is repeated over the field of view to provide a continuous sequence of picture images. The sequence of horizontal scans from the top to the bottom of the image produces a single frame or picture image of the scene. The rate of sequential picture images is the frame rate of the detection system.

The sequential picture images from detector system 19 have their pixels digitized by digitizer 24. Computer 26 then compares two sequential images of the scene by subtracting one sequential picture image from the next sequential picture image. Computer 26 identifies those pixels that have a different or substantially different value in the two sequential images. This is done by subtracting the digitized value of each pixel in one sequential image from the digitized value of a corresponding pixel in the next or other sequential image to produce a value for a resultant pixel. Then, the picture image of the resultant pixels is displayed to form a differential image.

The differential image is formed by imaging the resulting pixels having a non-zero value. All pixels within the display that did not change from one frame to the next are eliminated from the scene because their resultant value is zero (or approximately zero). All pixels within the display that have changed value between the two sequential picture images are shown as signature elements in the differential image. The only signature elements displayed should be the plume from a missile aircraft because only the gaseous emissions from the exhaust of the missile in the scene are moving at a speed fast enough to change positions between frames of the picture images. If any pixels are identified that have a changed value, computer 26 directs countermeasure unit 28 to deploy an anti-missile countermeasure such as a flare, and directs warning system 27 to transmit an alert to the pilot that a high velocity plume has been detected. Also, computer 26 forms a differential picture image from the identified pixels by displaying only the identified pixels on display 29.

It has been found that the standard scan rate of 30 Hz used in modern television systems is sufficiently high to eliminate all but the fastest moving object from the differential image. Thus, only the missile exhaust or plume having a high modulation rate is observed in the differential image. The differential image allows for a high detection of the presence of a missile launch, while eliminating non-desirable interference within scenes. All that is eliminated is noise producing false targets that obstruct the function of the missile launch detection.

Similarly, any other type of vehicle having a high velocity gaseous emission can be detected using the method of the present invention. For instance, any aircraft, tank, ship, or command post generator exhaust may be detected by this scene difference method. Natural non-moving false alarms or false targets are not displayed or detected by the scene difference method and are effectively eliminated.

It will be appreciated that these natural backgrounds are recognized as noise to the detection. Consequently, the signal-to-noise ratio of the detection system is substantially increased over prior art systems, allowing for substantially greater detection ranges than conventional detection systems.

In an alternative embodiment, the detection system is capable of eliminating false targets from the differential image. After an initial detection of a missile exhaust or plume is made using the comparison of sequential images formed 1/30 of a second apart (30Hz), and the detection system has determined the presence of a probable threat, a warning will be given to the pilot and a flare is automatically launched to decoy the missile. The pilot will observe the warning and see the threat in the displayed differential image. At the pilot's discretion, flares will continue to be launched to protect the aircraft.

In the event that the warning is produced by a non-threatening object (a false target), for example by another friendly aircraft, a flare launching, or an ejection seat firing, the pilot can choose to increase the frame rate of the detection system's sensor to 300 Hz or greater. At this higher frame rate, the above false targets will not be detected and only a missile or an after-burning jet engine having a high velocity exhaust will be detected. This is because only the high intensity internal Mach diamond emissions of the exhaust are modulating at a rate greater than the 300 Hz frame rate of the detection system. Therefore, only an after-burning jet or a missile can produce a warning and flare launch in the high scan rate detection system of the present invention.

As will be appreciated by those skilled in the art, the initial flare is launched automatically because the pilot often does not have enough time to detect the warning and analyze the threat. The automatic launching of the initial flare upon the detection of a potential threat while the detection system is imaging and detecting at 30 Hz allows the pilot time under the protection of the initial flare to make an additional determination of the threat at the 300 Hz frame rate of the detection system.

In the event that the detection system of the present invention is mounted on an aircraft that is moving fast enough to shift background images within the field of view of the sensor, these natural images within the scene will be displayed in the differential image. In this case, the scan rate of the sensor would be increased to effectively make the scan rate faster than these motion effects so that these natural background images will not register in the differential image.

Figure 3A:
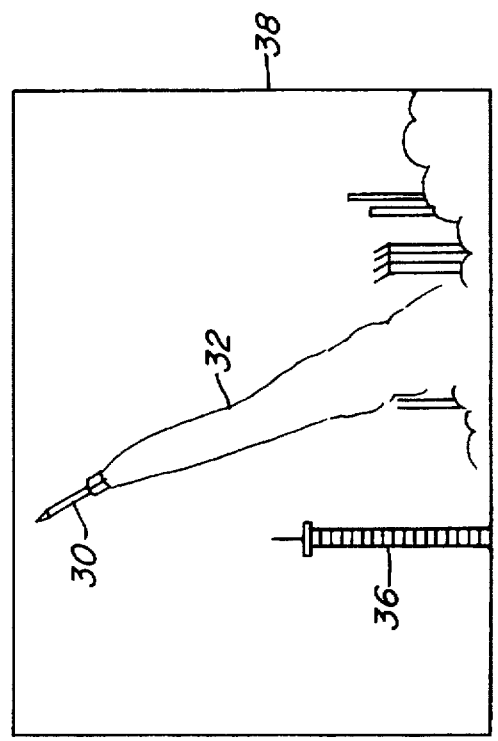
FIGS. 3A-3C illustrate the two sequential images and resultant differential image from the method of missile modulation detection by time sequence differentiation of the present invention.
Figure 3B:
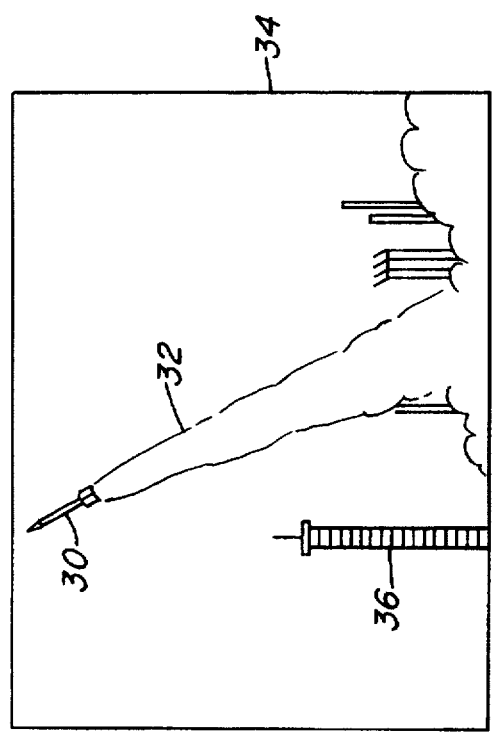
Figure 3C:
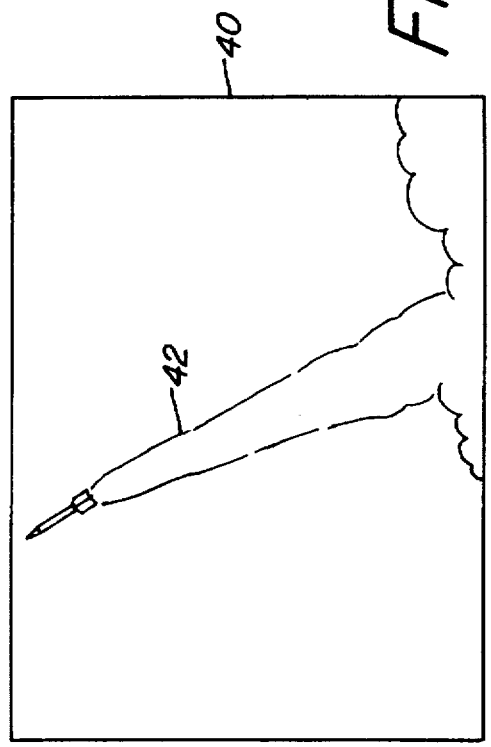

FIGS. 3A–3C illustrate the method and system of missile modulation detection by time sequence differentiation. FIG. 3A shows a first sequential picture image 34 within a field of view that includes a launching missile 30 having an exhaust plume 32 and a tower 36. This sequential picture image 34 can be taken by a video camera, for example. FIG. 3B is a second sequential image 38 of the same field of view taken 1/30 of a second after the first sequential picture image 34. Both FIGS. 3A and 3B show the launching missile 30 and its high velocity exhaust 32, as well as a variety of background objects, including tower 36, which are not moving.

Each of these sequential picture images 34, 38 in FIGS. 3A and 3B are formed by a plurality of pixels imaging at a level proportional to the ultraviolet, infrared, or visible light detected by the detection system's sensors in that pixel's portion of the field of view. Each pixel in the two sequential picture images 34, 38 is digitized by assigning it a digital number proportional to the pixel's output level. Then the digital values for the pixels in sequential picture image 34 of FIG. 3A is subtracted from the corresponding pixels forming the sequential picture image 38 of FIG. 3B to produce values for resulting pixels that are displayed to form a differential image 40, as shown in FIG. 3C.

It can be seen from differential image 40 that only those pixels identified in the sequential picture image 34 that had a different value than the corresponding pixel in the sequential picture image 38 are displayed in the differential picture image 40 of FIG. 3C. Thus, only the high velocity exhaust of the missile had a modulation greater than the 30 Hz frame rate of the detection system and was registered in the differential image. As can be seen from FIG. 3C, missile body 30 and background objects including tower 36 are eliminated in the differential image 40. Only the modulating exhaust 42 is viewed within the difference scene of differential image 40. In a like manner, the differential image of fighter jet would only show the jet's plume, while eliminating the jet and all background objects.

In conclusion, the rapid exit and ignition of gaseous exhaust emission from missiles, jets and other aircraft produces high plume modulations that are observed by the detection system of the present invention by obtaining the difference over time of either the fluctuation of the plume's emission or by observing the difference of ambient light reflected from the plume. Backgrounds or false targets are effectively eliminated because they lack modulations as function of time.

While the invention has been shown in only one of its forms, it should be apparent to those skilled in the art that it is not so limited, but is susceptible to various changes without departing from the scope of the invention.

I claim:

1. A method of automatically deploying an antimissile countermeasure and transmitting an alert in response to a missile launch against an airborne aircraft, the method being performed on the airborne aircraft and comprising the steps of:

viewing an exhaust plume of a missile within a field of view;

forming at least two sequential images of the field of view in which the exhaust plume is located, each image being formed by a plurality of pixels, wherein each pixel images a portion of the field of view;

wherein each pixel in each of the sequential images will have a value corresponding to one or more characteristics of the pixel;

digitizing the values and subtracting the values of the pixels in one of the sequential images to corresponding pixels in the other sequential image and identifying those pixels in one sequential image that have a different value than the corresponding pixel in the other sequential image;

automatically deploying an antimissile countermeasure and at the same time transmitting to a pilot of the airborne aircraft an alert in response to any pixels being identified;

forming and displaying to the pilot a differential image of the identified pixels to enable the pilot to determine whether the alert is justified; and terminating the countermeasure if the alert is not justified.

2. The method according to claim 1, wherein the sequential images are formed by a video camera, and the characteristic is the level of received light in the portion of the field of view corresponding to the pixel.

3. The method according to claim 1, wherein the sequential images are formed by a radio receiver, and the characteristic is the level of received RF electromagnetic radiation in the portion of the field of view corresponding to the pixel.

4. The method according to claim 1, wherein the sequential images are formed by a UV sensor, and the characteristic is the level of received UV electromagnetic radiation in the portion of the field of view corresponding to the pixel.

5. The method according to claim 1, wherein the sequential images are formed by an infrared imaging camera, and the characteristic is the level of received IR electromagnetic radiation in the portion of the field of view corresponding to the pixel.

6. A method of deploying an antimissile countermeasure and transmitting an alert in response to a missile launch against an airborne aircraft, the method being performed on the airborne aircraft and comprising the steps of:

(a) viewing an exhaust plume of a missile within a field of view;

(b) forming at least two sequential images of the field of view in which the exhaust plume is located, each image being formed by a plurality of pixels, wherein each pixel images a portion of the field of view, and each pixel in each of the sequential images will have a value corresponding to one or more characteristics of the pixel;

(c) digitizing the values and subtracting the values of the pixels in one of the sequential images to corresponding pixels in the other sequential image and identifying those pixels in one sequential image that have a different value than the corresponding pixel in the other sequential image;

(d) transmitting to a pilot of the airborne aircraft an alert in response to any pixels being identified and also forming and displaying to the pilot a differential image of the identified pixels to enable the pilot to determine whether the alert is justified; and (e) deploying an antimissile countermeasure.

7. The method according to claim 6 wherein step (e) is performed automatically at the same time step (d) is being performed.

8. The method according to claim 6, wherein the sequential images are formed by a video camera, and the characteristic is the level of received light in the portion of the field of view corresponding to the pixel.

9. The method according to claim 6, wherein the sequential images are formed by a radio receiver, and the characteristic is the level of received RF electromagnetic radiation in the portion of the field of view corresponding to the pixel.

10. The method according to claim 6, wherein the sequential images are formed by a UV sensor, and the characteristic is the level of received UV electromagnetic radiation in the portion of the field of view corresponding to the pixel.

11. The method according to claim 6, wherein the sequential images are formed by an infrared imaging camera, and the characteristic is the level of received IR electromagnetic radiation in the portion of the field of view corresponding to the pixel.

* * * * *